Figure 1:
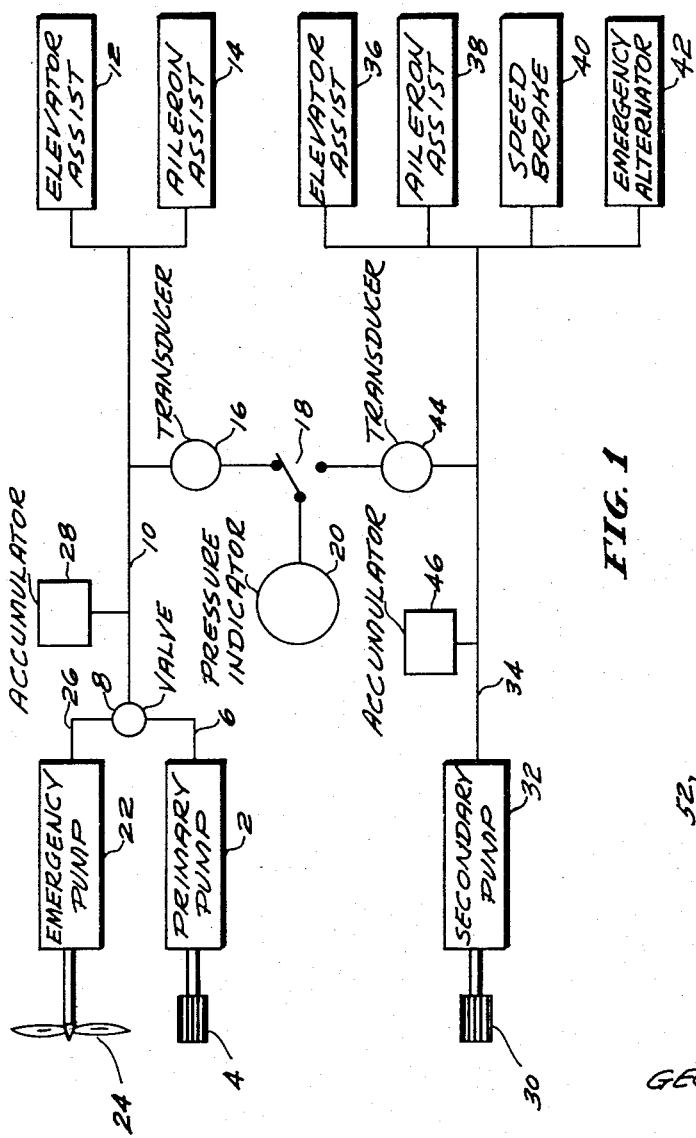

Oct. 10, 1961 G. A. DECKER 3,003,253
SIMULATED HYDRAULIC PRESSURE SYSTEM
Filed April 7, 1959 2 Sheets-Sheet 1

GEORGE A. DECKER
INVENTOR
BY Delbert A. Warner
ATTORNEY

GEORGE A. DECKER
INVENTOR

United States Patent Office

3,003,253
Patented Oct. 10, 1961

3,003,253
SIMULATED HYDRAULIC PRESSURE SYSTEM
George A. Decker, Hillcrest, N.Y., assignor to General Precision Inc., a corporation of Delaware
Filed Apr. 7, 1959, Ser. No. 804,631
5 Claims. (Cl. 35—12)

The present invention relates to the simulation of aircraft hydraulic systems in flight trainers. More particularly, the invention relates to the simulation of characteristics of a hydraulic system such as pressure, capacity and load or demand.

In grounded flight trainers the need for more realistic presentations continues to grow with improvements in the performance of the aircraft being simulated. Generally speaking, the prior art flight simulators have not been designed with means for accurately simulating hydraulic pressure, because accurate knowledge of that particular quantity was thought to be unnecessary and suitable approximations of the pressure in older aircraft could easily and cheaply be made. With present day, high performance aircraft, not only must the indications of instruments indicating factors of primary concern, such as velocity, azimuth, altitude and the like, be simulated accurately, but the indications of instruments showing factors of less vital importance must also be shown accurately. Among these less vital, but important indications, is that of fluid pressure in the hydraulic systems.

It is a primary object of this invention, therefore, to provide for more realistic simulation of aircraft hydraulic systems.

It is an additional object of this invention to provide means for simulating the relationship and effects of hydraulic system pressure, capacity and load demand.

It is a further object of this invention to simulate the effects on the pressure of a hydraulic system when the load demand exceeds the system capacity.

It is another object of this invention to provide means for simulating a wide variety of pressure or vacuum systems in aircraft.

It is yet another object of this invention to provide means to simulate the operation of primary, secondary and emergency pressure systems such as are found in aircraft.

The invention provides means for simulating primary and secondary hydraulic pressure systems and certain emergency pressure supplies for high performance aircraft. It includes means for indicating the pressure in the system at all times regardless of which of the pressure providing components is in operation and takes into account the failure of any of these components as well as the effects when the demands of various devices exceed the capacity of the system. In short, the invention provides for the simulation of an aircraft hydraulic system, taking into account the interrelationships between system pressure, capacity and load demand.

Figure 2:
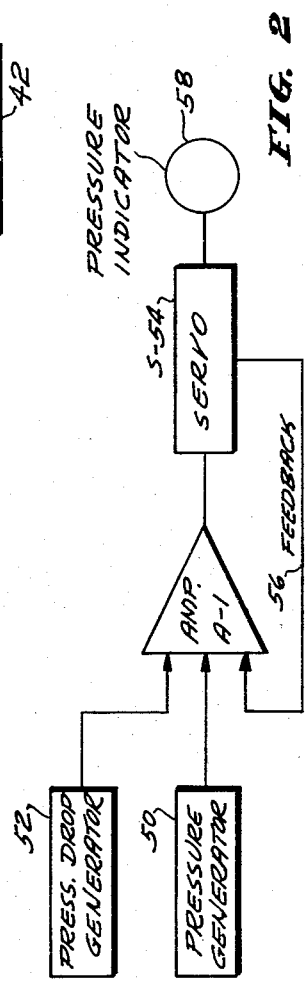
Figure 3:
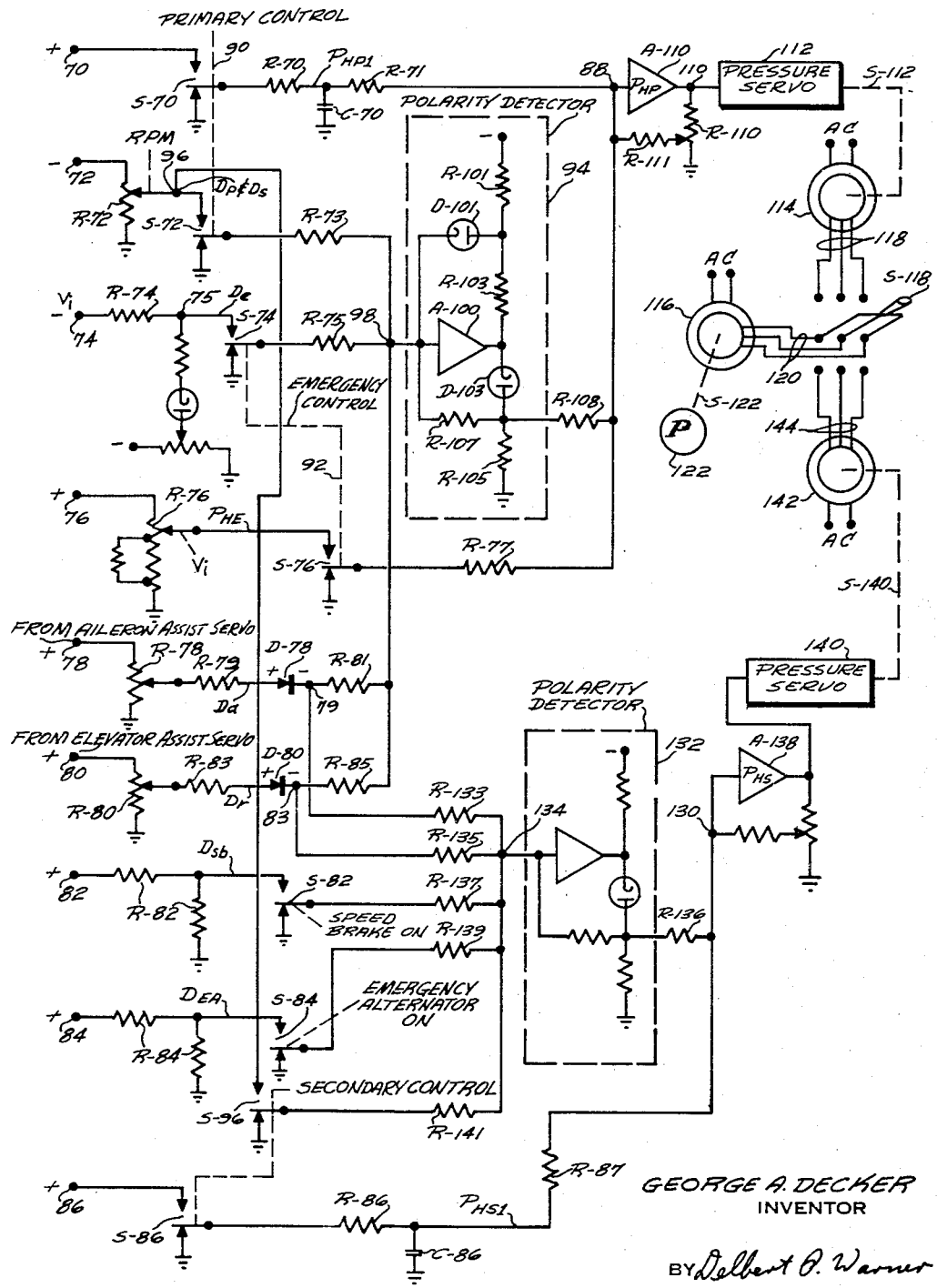

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is a block diagram illustrating, in simplified form, a typical aircraft hydraulic system, FIG. 2 is a schematic diagram illustrating the fundamental relationships of interest in the instant invention; and FIG. 3 is a schematic diagram illustrating an embodiment of the present invention in considerable detail.

Turning first to the block diagram of FIG. 1, it will be noted that a simplified version of a typical aircraft dual hydraulic system is indicated in the block diagrams. Starting at the left, block 2 is designated as a primary pump which is driven by the aircraft engine through a mechanical connection 4 to provide pressure through a hydraulic line 6, valve 8 and line 10 to blocks designated as elevator assist 12 and aileron assist 14 on the right. The pressure appearing in line 10, which represents the pressure of the primary hydraulic system, is transmitted to a transducer 16, which converts the pressure signal to an electrical signal, and the electrical signal is then transmitted through the contacts of switch 18 to indicator 20. A direct hydraulic pressure indicator may be used, of course, in place of the transducer and electric meters. Many aircraft have employed an emergency pump for use in the event that the primary pump in the primary hydraulic system fails. Such a pump is indicated at 22 and may be driven by a stream of air passing through the blades of a propeller indicated at 24. The pressure simulated by the pump 22 would then be transmitted through a hydraulic line 26 to the valve 8 which is designed to transmit pressure from either line 26 or line 6 to line 10.

A secondary hydraulic system is also shown in FIG. 1 which is driven by a shaft 30 from the engine through a pump 32 to provide pressure in line 34. Pressure in line 34 is transmitted to provide the necessary force to operate the elevator assist 36, aileron assist 38, speed brake 40 and the emergency alternator 42. The pressure in line 34 is transmitted to transducer 44 where it is converted to an electrical signal and is then transmitted through the contacts of switch 18 to pressure indicator 20. It will be recognized that separate indicators for the primary and secondary pressure systems may be used. In the event that only a single pressure indicator is used, the switch 18 may be operated by switching means (not shown) to permit indicator 18 to indicate each pressure on a time sharing basis. Accumulators 28 and 46 are connected to lines 10 and 34 respectively to aid in the stabilization of the pressure in those lines in the usual manner.

It will be recognized that the primary and secondary pressure systems illustrated in FIG. 1 are such that the pressure in those systems is dependent upon a number of factors including the pressure supplied by the pumps, the capacity of the systems, and the loads imposed by the elevator assist mechanisms, the aileron assist mechanisms, or other load devices. It will be further recognized that the total capacity of the system will not vary greatly nor will the rate of rotation of the pump, which is dependent on aircraft engine speed, be changed greatly by changes in the load imposed on the system. Since the rate of supply of fluid and the capacity of the system are limited, it must then follow that the pressure of the system will drop whenever the load is increased and it is very important that this change in pressure due to change in load should be accurately reflected in a modern aircraft trainer just as it would be in an aircraft embodying the scheme in FIG. 1.

The diagram in FIG. 2 illustrates, in simplified form, an embodiment of the instant invention which is designed to provide an appropriate change in signal strength to represent the changes in pressure within a hydraulic system such as that in FIG. 1, whenever the load on the system changes. To that end, a function generator is shown at 50 to provide a potential representing the potential supplied by the primary pump in FIG. 1. The effect of the loads 12, 14, 36, 38, 40 and 42 are simulated by the circuit in block 52, which is designed to provide a potential of appropriate polarity to indicate a drain on the pressure line due to loads on the load devices whenever such loads are simulated. The outputs of generators 50 and 52 are then summed by amplifier A—1 to provide an output proportional to the pressure in the system. The output of amplifier A—1 is provided to servo S—54 with suitable feedback circuits, as shown at 56. The output of the servo S—54 may be mechanically coupled to a pressure indicator at 58 or it may be coupled to a synchro transmitter and then to a synchro receiver which in turn is coupled to an indicator.

For a more detailed discussion of a preferred embodiment of this invention we turn now to FIG. 3. In FIG. 3 a primary pressure generator and a pressure drop generator are shown as in FIG. 2 and an emergency pressure generator is also shown. The pressure drop generator associated with the primary hydraulic pressure system sums the delivery rate signal of the pressure supply with the demand signals of the various loads to provide an output, when the load exceeds the supply, representing the resulting drop in pressure. This latter quantity is summed with the potential from the pressure generator to represent the pressure of the system as in FIG. 2. A similar system is also supplied to represent a secondary hydraulic system as indicated in FIG. 1.

It should be noted in connection with the discussion of FIG. 3 that all of the switches contained therein are shown in their "off" state, i.e., they are shown in the position they assume before operation by their controlling elements. For example, switch S-70 is shown with its blade touching a grounded contact, but as soon as the system is made operative by the operation of the primary hydraulic pressure control or "primary control" 90, the blade will close on the upper contact to connect the potential at 70 into the circuit. Showing switches operating in this manner is conventional and serves the useful purpose of illustrating the condition of the switches in a system while it is not operating and avoids the confusion which would result if some switches were shown closed and some shown open or all were shown closed when they would never, in fact, assume such states all at one time.

A plurality of input potentials are supplied at terminals 70, 72, 74, 76, 78, 80, 82, 84, 86 of FIG. 3 with polarity as indicated. The potentials appearing on terminals 70, 72, 76, 82, 84 and 86 are constant and may be used with various function generators to provide outputs representing various desired quantities. The potential on terminal 70, for example, is supplied through the contacts of switch S—70 to a resistor R—70 which supplies a constant potential through R—71 representative of the primary pump pressure $P_{HP1}$ which is supplied to the primary hydraulic system. This potential is applied at terminal 88 for use in further operations. The condenser C—70 connected between R—70, R—71 and ground provides means to simulate a hydraulic accumulator in the system. The potential supplied on terminal 76 is applied across potentiometer R—76, the wiper arm of which is positioned in accordance with airspeed by the potentiometer shaft, to provide an output potential which represents the pressure signal from the emergency pump $P_{HE}$. This signal may be supplied through the contacts of switch S—76 and through scaling resistor R—77 to terminal 88. The potential applied at terminal 88 may be dependent upon the selection of the student pilot, since he may choose either the primary hydraulic pressure control or "primary control" at 90 or the emergency hydraulic pressure control or "emergency control" at 92. The pilot generally closes the control at 90 until such time as there is a failure in the primary system and he must use the emergency pressure supply. It will be recognized, of course, that the emergency pressure control may be subject to operation by automatic devices not shown here.

The decrease of pressure in the primary system is simulated by a potential supplied by a polarity detector, indicated in the dashed block 94. The potentials supplied to this block 94 originate on terminals 72, 74, 78 and 80 and are modified before summing in 94 to represent certain desired characteristics. The negative potential applied at terminal 72 and across potentiometer R—72 is multipled by the wiper arm of potentiometer R—72 which is controlled by the potentiometer shaft which in turn is rotated in accordance with r.p.m. or the speed of the aircraft engine to represent the delivery rate signals $D_P$ and $D_S$ to both the primary and the secondary hydraulic systems. The characteristics of potentiometer R—72 are tailored to match the r.p.m. versus delivery rate curve of the hydraulic pump. The potential from R—72 is supplied at terminal 96 and from there to two switches. The first of these, S—72, when closed to represent that the primary hydraulic pressure control has been operated, provides a potential through resistor R—73 to the input terminal 98 of the polarity detector 94. The negative potential at terminal 74 is proportional to $-V_i$, or indicated airspeed, which is supplied by a source in an aircraft simulator through a resistor R—74 and is modified by a function generator comprising a resistor, a diode and a potentiometer connected between terminal 75 and ground. The resultant potential at terminal 75 may be made proportional to the emergency pump delivery rate signal $D_e$ and will be supplied through the contacts of switch S—74 and through resistor R—75 to terminal 98, when the emergency hydraulic pressure control mechanism 92 is operated.

A varying positive potential is applied at terminal 78 which is proportional to the rate of aileron surface movement and likewise proportional to the hydraulic fluid deman required to attain said rate. Said potential thus represents the demand signal which is supplied from the aileron assist servo located elsewhere in the simulator. This potential is supplied through a potentiometer R—78, the wiper arm of which is positioned to calibrate the system and thereafter is not changed. The potential appearing on the wiper arm is supplied through a resistor R—79 to represent the aileron demand signal $D_a$. This signal is supplied through diode D—78 to a terminal 79 and from there through a resistor R—81 to terminal 98. A variable positive potential proportional to the rate of elevator surface movement and likewise proportional to the hydraulic fluid demand required to attain said elevator rate is derived from an elevator assist servo located elsewhere in the simulator and applied at terminal 80 to a potentiometer R—80. The wiper arm of potentiometer R—80 is positioned to calibrate the system and thereafter is not changed. The potential appearing on the wiper arm of R—80 is supplied through a resistor R—83 to represent the aileron demand signal $D_r$. The aileron demand signal is then applied through a diode D—80 to a terminal 83 from which it is supplied through a resistor R—85 to input terminal 98.

The polarity detector 94 consists of an amplifier A—100 connected to input terminal 98 and to diodes D—101 and D—103 together with resistors R—101, R—103, R—105, and R—107 connected in a conventional manner as shown. The polarity detector provides an output having a magnitude proportional to excessive demand through a resistor R—108. This output occurs only when the demand signals exceed the delivery rate signals to indicate that the pressure in the system has decreased due to excessive loads.

The potentials appearing at terminal 88 are summed by action of a summing amplifier A—110 to provide an output at terminal 110 which is proportional to the pressure $P_{HP}$ in the primary hydraulic pressure system. Potentiometer R—110 and resistor R—111 provide a suitable feedback for the amplifier A—110. The output at terminal 110 is supplied to a pressure servo mechanism 112 which may directly activate a meter by mechanical connections or may, through a shaft S—112, operate a synchro sending element or a synchro generator 114 which may in turn supply a synchro receiver 116 through suitable connecting lines 118 and 120 and switch S—118. The synchro receiver 116 may then be used to position a meter 122 through a shaft S—122.

Having considered the primary hydraulic pressure system, we now turn to the secondary hydraulic pressure system which in principle is like the primary system. In the case of the secondary pressure system only a single pump to supply pressure is disclosed, since an emergency pump system for the secondary pressure system is not ordinarily supplied to aircraft and its simulation would be like that for the primary system, if it were supplied. The secondary pump pressure signal $P_{HS1}$ is supplied to this system from terminal 86 through a switch S—86, which is opened and closed by the secondary hydraulic pressure control or "secondary control," and resistors R—86 and R—87 to the input terminal 130 of a summing amplifier A—138. One terminal of condenser C—86 is connected between resistors R—86 and R—87 and the other is connected to ground to simulate the effects of the hydraulic accumulator which is present in the secondary hydraulic pressure system as illustrated in FIG. 1. A polarity detector 132 is supplied for the secondary hydraulic pressure system. This polarity detector had identical characteristics with polarity detector 94. Due to this similarity between the two polarity detectors, circuit 132 will not be described in detail.

The aileron demand signal $D_a$ appearing on terminal 79, described above, is supplied through a resistor R—133 to the input terminal 134 of the polarity detector 132. The rudder demand signal $D_r$ appearing on terminal 83, as discussed above, is supplied through a resistor R—135 to the input terminal 134. The speed brake demand signal $D_{sb}$ is generated from a positive potential applied at terminal 82 and through a resistor network R—82, and switch S—82 which is opened and closed by the "speed brake on" control. When switch S—82 is closed the speed brake demand signal will be supplied through a potentiometer R—137 to input terminal 134. An emergency alternator demand signal $D_{EA}$ is supplied by the resistance network R—84 from the positive potential at terminal 84 to the upper contact of switch S—84 which is opened and closed by the "emergency alternator on" control. When the emergency alternator is "on", this potential will be supplied through a resistor R—139 to the input terminal 134 of polarity detector 132. The secondary delivery rate signal $D_S$ is supplied, as indicated above, at terminal 96 and through switch S—96 which is opened and closed by the secondary hydraulic pressure control or "secondary control" and resistor R—141 to the input terminal 134 of the polarity detector 132.

The polarity detector 132 functions like the polarity detector 94 to provide a proportional output potential whenever the demand signals exceed the delivery signals. Said potential is applied through a resistor R—136 to the terminal 130 where it is summed with the secondary pump pressure signal $P_{HS1}$ by amplifier A—138 to provide an output proportional to the hydraulic pressure $P_{HS}$ in the secondary system and to operate a pressure servo 140, a shaft S—140, and a synchro sender 142. The synchro sender 142 is connected to switch S—118 through lines 144 and from the switch S—118 it may activate the synchro receiver pressure indicator as discussed above. It will be recognized that separate indicating meters may be used with the two pressure systems and also that there may be a time sharing of a single indicator through switch S—118, if the switch is connected to suitable controls.

The particular causes of pressure and fluid drain shown in connection with the preferred embodiment will be recognized as only a few of the many possibilities. Additional elements might be simulated in addition to or instead of those illustrated such as a rudder assist system.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In an aircraft simulator, means for simulating a hydraulic pressure system comprising means for providing a potential proportional to the pressure in a primary hydraulic system as produced by a pump, additional means for providing a second potential proportional to the change in hydraulic pressure in said system due to changes in demand, means for summing said first and second potentials to provide a third potential representing true hydraulic pressure in said primary hydraulic system, meter means to indicated hydraulic pressure, switching means to connect said meter means to said third potential for indicating the magnitude of said true hydraulic pressure in said primary hydraulic system, means for providing a fourth potential proportional to the pressure in a secondary hydraulic system as produced by a second pump, means for providing a fifth potential proportional to the change in hydraulic pressure due to changes in demand in said secondary hydraulic system, means for summing said fourth and fifth potentials to provide a sixth potential representing true hydraulic pressure in said secondary system, and means including said meter means and said switching means to connect said meter to be responsive to said sixth potential for indicating the magnitude of said true hydraulic pressure in said secondary hydraulic system.

2. In an aircraft simulator, means for simulating a hydraulic pressure system comprising a first function generator for providing a potential proportional to hydraulic pressure in a primary hydraulic system as provided by a pump, a second function generator for providing a potential proportional to the change in hydraulic pressure in said system due to changes in demand, means for summing said first and second potentials to provide a third potential representing true hydraulic pressure in said primary hydraulic system, a third function generator for provided a fourth potential proportional to hydraulic pressure in a secondary hydraulic system as provided by a pump, a fourth function generator for providing a fifth potential proportional to the change in hydraulic pressure due to changes in demand in said secondary hydraulic system, means for summing said fourth and said fifth potentials to provide another potential representing true hydraulic pressure in said secondary system, and means selectively responsive to said third potential and said sixth potential for indicating the magnitude of said true hydraulic pressure in said primary hydraulic system and in said secondary hydraulic system.

3. In an aircraft simulator, means for simulating a hydraulic pressure system comprising a first function generator for providing a first potential proportional to hydraulic system pressure due to a pump, means for providing a second potential of one polarity proportional to the fluid delivery rate of said pump and means for providing a group of potentials of opposite polarity proportional to the fluid demand rates of various load devices, means for adding said third potential and said group of potentials to provide a fourth potential representing any excess of demand over delivery, means for summing said first potential and said fourth potential to provide an additional potential representing true hydraulic pressure and means responsive to said additional potential for indicating the magnitude of said true hydraulic pressure.

4. In an aircraft simulator, means for simulating a hydraulic pressure system comprising means for providing a first potential proportional to hydraulic system pressure due to a pump, means for providing a second potential of a first polarity proportional to the fluid delivery rate of said pump, means for providing a third potential of a second polarity proportional to the fluid demand rates of various load devices, means for comparing said second potential and said third potential to provide a fourth potential in the event that said third potential exceeds the second but not otherwise, means for summing said first potential and said fourth potential to provide an additional potential representing true hydraulic pressure and means responsive to said additional potential for indicating the magnitude of said true hydraulic pressure.

5. In an aircraft simulator, means for simulating a hydraulic pressure system comprising a first function generator for providing a first potential proportional to hydraulic system pressure due to a pump, means for providing a second potential of a first polarity proportional to the fluid delivery rate of said pump, means for providing a group of potentials of a second polarity proportional to the fluid demand rates of various load devices, means including a polarity detector for adding and comparing said second potential and said group of potentials to provide a third potential having a magnitude other than zero in the event there is any excess of demand over delivery, means for summing said first potential and said third potential to provide an additional potential representing true hydraulic pressure and means responsive to said additional potential for indicating the magnitude of said true hydraulic pressure.

References Cited in the file of this patent

UNITED STATES PATENTS

| | | |
|---|---|---|
| 2,510,500 | Hayes et al. | June 6, 1950 |
| 2,516,803 | Rippere | July 25, 1950 |
| 2,519,698 | Pearsall | Aug. 22, 1950 |